United States Patent [19]

Pristash et al.

[11] Patent Number: 5,136,480
[45] Date of Patent: Aug. 4, 1992

[54] THIN PANEL ILLUMINATOR

[75] Inventors: David J. Pristash, Brecksville; Jeffery R. Parker, Concord, both of Ohio

[73] Assignee: Lumitex, Inc., Cleveland, Ohio

[21] Appl. No.: 642,791

[22] Filed: Jan. 18, 1991

Related U.S. Application Data

[62] Division of Ser. No. 309,424, Feb. 10, 1989, Pat. No. 5,005,108.

[51] Int. Cl.$^5$ ............................................. F21V 7/04
[52] U.S. Cl. ...................................... 362/31; 362/26; 362/32
[58] Field of Search ................... 362/26, 27, 31, 32; 350/96.1

[56] References Cited

U.S. PATENT DOCUMENTS

| | | | |
|---|---|---|---|
| 4,277,817 | 7/1981 | Hehr | 362/31 |
| 4,648,690 | 3/1987 | Ohe | 362/31 |
| 4,729,068 | 3/1988 | Ohe | 362/26 |
| 4,791,540 | 12/1988 | Dreyer, Jr. et al. | 362/31 |
| 4,811,507 | 3/1989 | Blanchet | 40/546 |
| 4,890,201 | 12/1989 | Joft | 362/31 |
| 4,909,604 | 3/1990 | Kobayashi et al. | 362/31 |
| 4,914,553 | 4/1990 | Hamada et al. | 362/31 |

FOREIGN PATENT DOCUMENTS

1035788 8/1953 France .

Primary Examiner—Ira S. Lazarus
Assistant Examiner—Sue Hagarman
Attorney, Agent, or Firm—Renner, Otto, Boisselle & Sklar

[57] ABSTRACT

Thin panel illuminator includes a solid transparent panel member having one or more deformed output regions which cause light entering the panel along an input edge thereof to be emitted along the length of the panel. Light may be transmitted to one or more panel input edges from one or more light sources utilizing transition devices which convert easily focused light generally to the shape of the panel input surfaces.

15 Claims, 6 Drawing Sheets

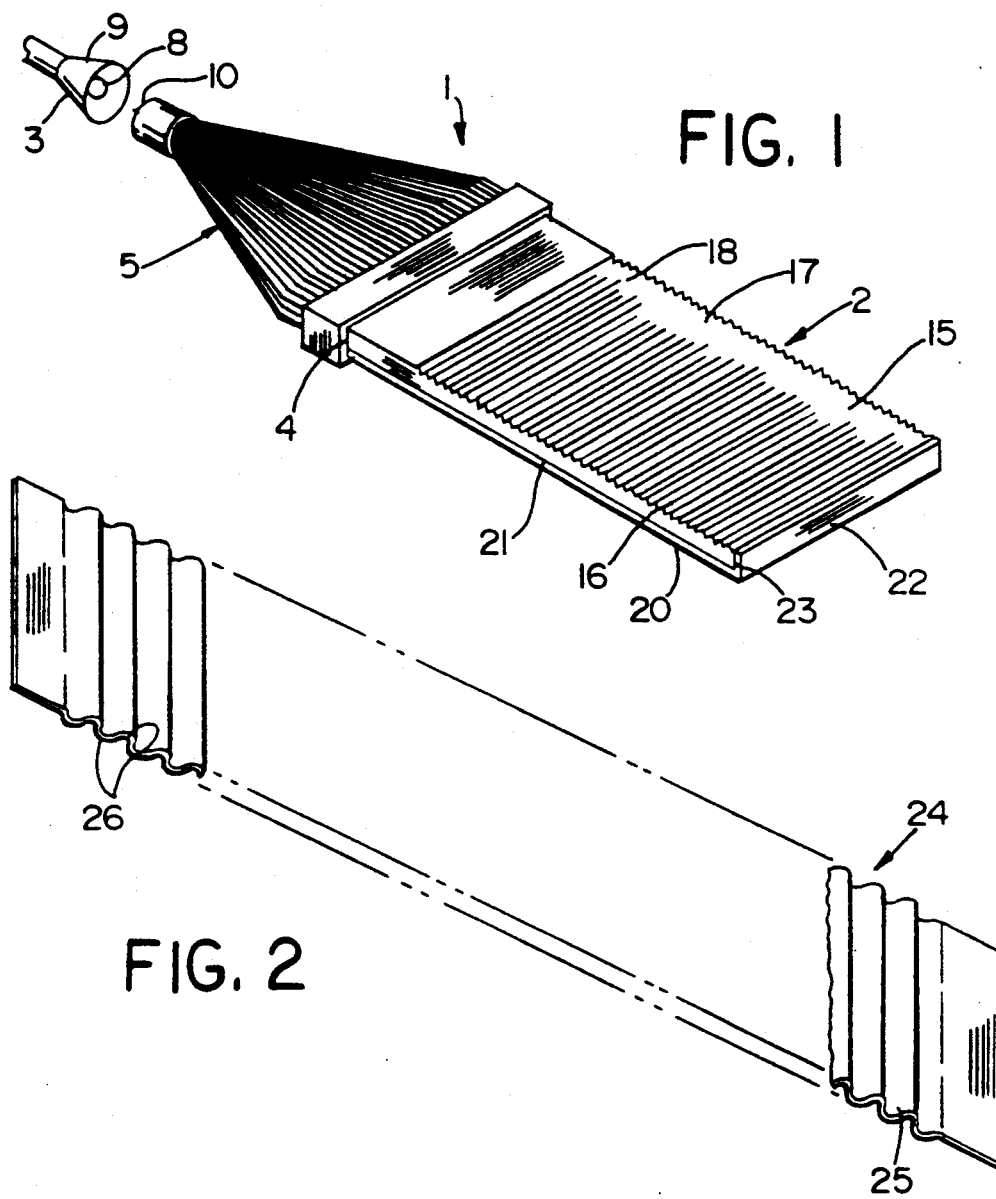
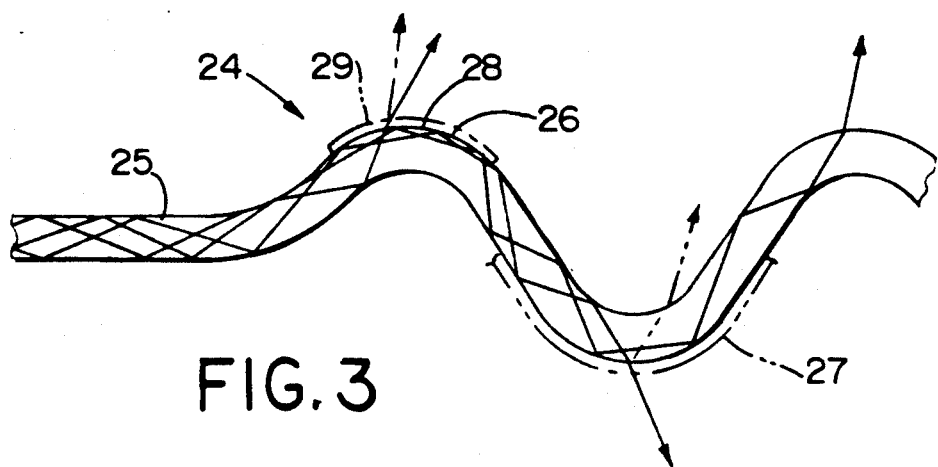

THIN PANEL ILLUMINATOR

This is a divisional of copending application Ser. No. 07/309,424 filed on Feb. 10, 1989, now U.S. Pat. No. 5,005,108.

BACKGROUND OF THE INVENTION

This invention relates generally, as indicated, to a thin panel illuminator including a solid transparent panel member for conducting light and extractor means for causing light conducted by the panel member to be emitted along the length thereof.

Light panel illuminators are generally known. However, the present invention relates to several different panel illuminator configurations which are less expensive to make and/or provide for better control over the light output from the panel. Also, the present invention provides for more efficient transmission of light from a light source to the light emitting panel.

SUMMARY OF THE INVENTION

In one form of the invention disclosed herein, the panel illuminator includes a light emitting panel member made of a thin light conducting ribbon or film bent, cast or formed into a predetermined pattern to cause light conducted thereby to be emitted along the length thereof. The effective radius of the bends, the number of bends per unit length, the panel thickness, the index of refraction ratio, and the internal ray distribution may be controlled to control the panel light output and efficiency.

In another form of the invention, the panel member comprises a solid transparent wave guide having a prismatic surface on one side to cause the light rays entering the wave guide through an input surface (end edge) to exceed the internal critical angle and be emitted. The size, shape and depth of the surface deformities may be varied along the length of the panel to produce a desired light output distribution. Also, a back reflector may be used to redirect emitted light back through the panel. Moreover, a second prismatic film may be placed in closely spaced relation to the panel prismatic surface to redirect the emitted light rays toward a particular application.

In still another form of the invention, the panel member comprises a prismatic film having prism ridges running generally parallel to each other, with deformities along the tops of the prism ridges to cause light to be emitted. Also, diffuser surfaces, which may vary in depth and/or width, may be formed along the length of the prismatic surfaces.

In each instance, the panels may be shaped to fit a particular application. Also, different light sources may be used to supply the panels with different types of radiation and reduce or eliminate others.

Further in accordance with the invention, the panel input surfaces may be lens shaped or tapered to alter the input light ray distribution. Also, such panel input surfaces may be coated with an antireflective or other coating.

In accordance with another aspect of the invention, a transition device is provided for converting easily focused light received from a light source to the shape of the panel input surface. In one form of the invention, the transition device includes an optical fiber transition member having a round or other shaped connector at one end to permit a source of light to be easily focused thereon, and a rectangular or other shaped connector at the other end corresponding in shape to the panel input surface.

In another form of the invention, the transition device is made from a solid transparent material, and is provided with single or multiple input and output ends of a desired shape. Also, the input and/or output ends of the transition device may be lens shaped to spread the light evenly across such surfaces, and such surfaces may be coated to absorb or reflect certain frequencies of radiation. Moreover, more than one transition device may be used to transmit light from more than one light source to a single panel, and the panel may have one or more light output regions of various shapes to produce a desired light output distribution.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

BRIEF DESCRIPTION OF THE DRAWINGS

In the annexed drawings:

FIG. 1 is a schematic perspective view of one form of thin panel illuminator in accordance with this invention;

FIG. 2 is a schematic fragmentary perspective view of a solid transparent light emitting ribbon panel in accordance with this invention;

FIG. 3 is an enlarged fragmentary side elevation view of the ribbon panel of FIG. 2 schematically showing how light rays are transmitted through and emitted from such panel;

DETAILED DESCRIPTION OF THE PREFERRED EMBODIMENTS

Figure 4:
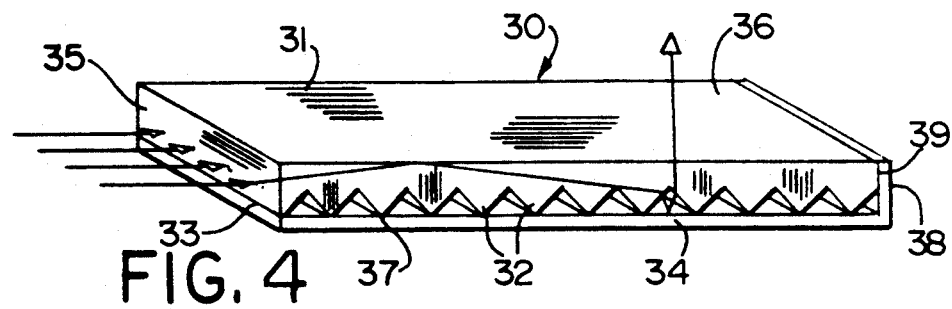
FIGS. 4–6 are perspective views of various other solid transparent light emitting panels in accordance with this invention.

Referring now in detail to the drawings, and initially to FIG. 1, there is schematically shown one form of thin panel illuminator in accordance with this invention including a solid transparent light emitting panel 2 and a light source 3 which generates and focuses light, in a predetermined pattern, either directly on a panel input edge 4 or on a transition device 5 which is used to make the transition from the light source 3 target shape to the light emitting panel input edge 4 shape as shown. The light that is transmitted from the light source 3 to the light emitting panel 2 may be emitted along the length of the panel as desired to produce a desired light output distribution to fit a particular application.

A light source 3 of any suitable type may be used, including, for example, any of the types disclosed in copending application Ser. No. 125,323, filed Nov. 24, 1987, now U.S. Pat. No. 4,897,771, granted Jan. 30, 1990, and assigned to the same assignee as the present application, which is incorporated herein by reference. Light source 3 includes a radiation source 8 such as an arc lamp, an incandescent bulb, a lens end bulb, an LED or a fluorescent tube or the like, and may have a collector 9 which collects the light emitted by the radiation source 8 and uniformly focuses the light on the input end 10 of the transition device 5 with predetermined ray angles to fit a particular application. For the thin panel illuminator 1 of the present invention to operate efficiently, the light source 3, transition device 5 and light emitting panel 2 must be designed to fit each other as well as the particular application. However, it should be understood that the light source 3, transition device 5 and light emitting panel 2 may also be used separately if desired.

Light emitting panel 2 comprises a solid transparent or translucent wave guide 15 made of glass, plastic or other suitable transparent or translucent material, with disruptions 16 on at least one side 17 formed as by cutting, molding, coating, forming or otherwise causing mechanical, chemical or other deformations in the exterior surface 18 thereof. When these disruptions 16 are struck by the light rays entering the panel input edge 4, they cause some of the light rays to exceed the internal critical angle and be emitted from the panel. The amount of light emitted from the panel will depend on the type, shape, depth and frequency of the disruptions 16. For example, if the exterior surface 18 is mechanically deformed at decreasingly spaced intervals as the distance from the light source 3 increases, there will be more uniform emission of light from the surface 18 when viewed from a distance. Also, such disruptions 16 may vary in depth and shape along the length of the panel 2 to produce a desired light output distribution.

A back reflector 20 may be provided on the side 21 of the panel 2 opposite the side 17 with the disruptions 16 therein. In like manner, an end reflector 22 may be provided on the end edge 23 opposite the input edge 4 to minimize the amount of light escaping from these surfaces.

Another light emitting panel 24 in accordance with this invention is schematically shown in FIG. 2 and comprises a thin light conducting ribbon or film 25 bent into a wave form of predetermined pattern. Although the dimensions of the panel 24 may vary, as an example, the panel 24 may be approximately 0.020 inch thick and have an overall height of approximately 0.040 inch, and be of any desired width or length depending on the particular application. Such a panel 24 may be made in any suitable manner, for example, by vacuum forming or injection molding. During the forming operation, the ribbon or film 25 is bent in a predetermined pattern, with the number of bends 26 per unit length, the effective bend radius, the panel thickness, the index of refraction ratio, and the internal ray distribution determining the light output and efficiency of the panel.

When the wave guide 25 is bent, certain light rays that were previously internally reflected will be emitted if the bends are below a critical radius. The critical radius is the radius of curvature at which these light rays first start to be emitted. By making the bends 26 more or less pronounced, the percentage of light emitted can be controlled for a given input ray distribution.

As schematically shown in FIG. 3, as certain light rays strike a bend surface 26 of panel 24, they exceed the internal critical angle and are emitted. If desired, one side of panel 24 may be provided with a back reflector 27 that reflects the light emitted from that side back through the panel towards an application as schematically shown in phantom lines in FIG. 3. Moreover, selected light emitting areas 28 of the panel 24 may be coated with a transparent coating 29 having a different refractive index than the light conducting ribbon or film 25 to cause changes in the attenuation of light being emitted from the panel 24 as further schematically shown in phantom lines in FIG. 3.

FIG. 4 shows another form of light emitting panel 30 in accordance with this invention including a solid transparent wave guide 31 similar to the wave guide 15 of FIG. 1 but having a prismatic surface 32 on a side 33 which is covered by a back reflector 34. Accordingly, when the prismatic surface 32 is struck by light rays entering an input end edge 35 of the wave guide 31, causing the light rays to exceed the internal critical angle and be emitted, the emitted light rays will be reflected back through the panel by the back reflector 34 and out the other side 36 of the panel as schematically shown in FIG. 4. The angles and/or depth of these prismatic surfaces 32 may be varied along the length of the panel 30 to produce uniform or other desired light output from the other side 36 of the panel.

In FIG. 4, the light rays are shown entering the panel 30 through an end edge 35 generally perpendicular to the prism edges 37. Also, an end reflector 38 is shown on the end edge 39 of the panel opposite the input end edge 35. However, if desired, light rays may be caused to enter the panel 30 from both end edges 35, 39, in which event the end reflector 38 would be eliminated.

Figure 5:
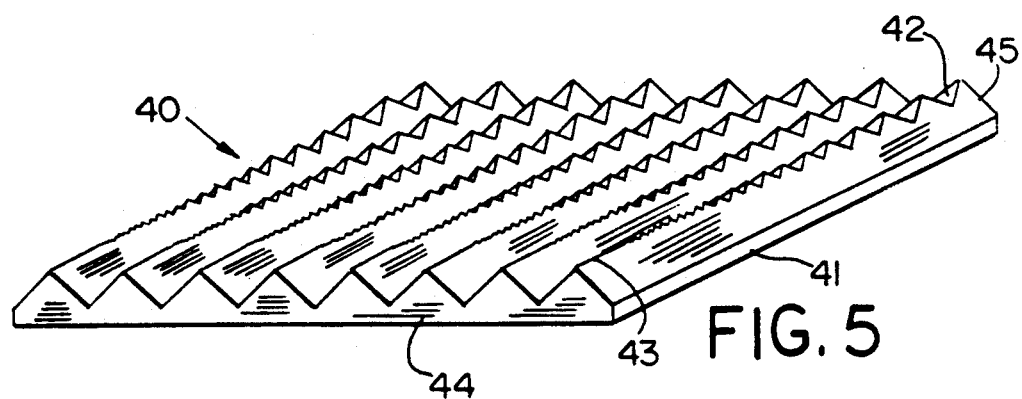

FIG. 5 shows another form of light emitting panel 40 in accordance with this invention comprising a solid transparent prismatic film 41 having deformities 42 cut, molded or otherwise formed along the top of the prism edges 43. Although the deformities 42 are shown as being of a generally triangular shape, they may be of any desired shape that causes light to be emitted, and may vary in depth and shape along the length of the prism edges 43 to produce a desired light output distribution. In this embodiment, light rays are caused to enter the panel 40 from one or both side edges 44, 45 in a direction generally parallel to the prism edges 43.

Figure 6:
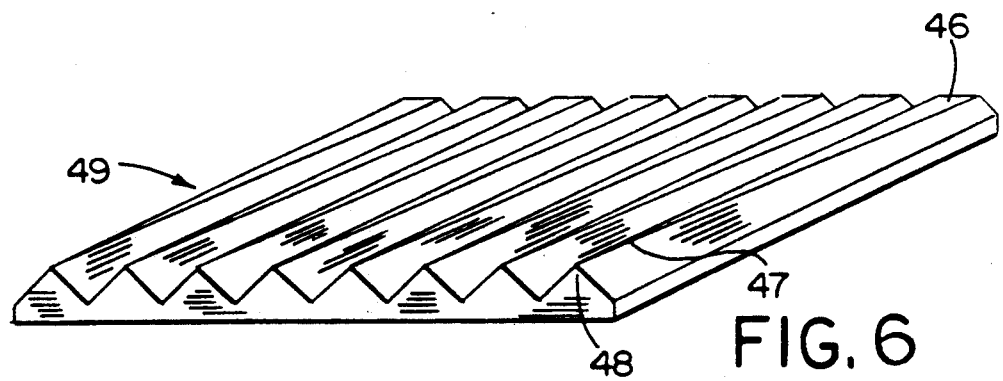

Alternatively, diffuser surfaces 46 may be formed along the top edges 47 of the prismatic surfaces 48 of a prismatic film light emitting panel 49 as schematically shown in FIG. 6. These diffuser surfaces 46 may vary in depth and/or width along the length of the panel 49, and may comprise a roughened surface, a lenticular surface, or a prismatic surface or the like that consists of multiple surface deformities. A roughened surface, for example, may be produced by grinding, sanding, laser cutting or milling. Also, both of the light emitting panels 40 and 49 shown in FIGS. 5 and 6 may have prismatic surfaces on both the top and bottom surfaces rather than on just one surface as shown, and one or the other of the top or bottom surface may be provided with a back reflector similar to the back reflector 34 shown in FIG. 4 to redirect emitted light back through the panel toward a particular application.

Figure 7:
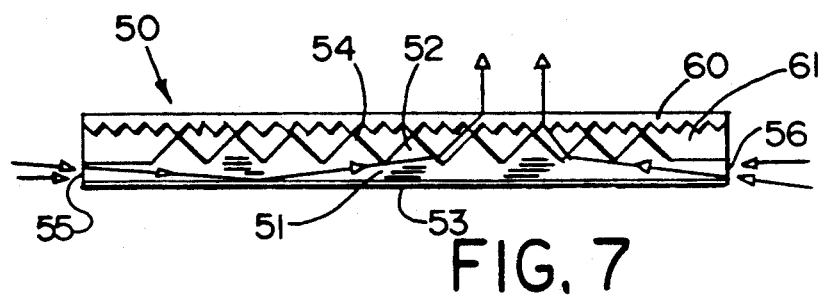
FIG. 7 is a side elevation view of another form of solid transparent light emitting panel in accordance with this invention schematically showing light rays entering opposite ends of the panel and being emitted therefrom.

FIG. 7 schematically shows another form of light emitting panel 50 in accordance with this invention which also comprises a solid transparent prismatic film 51 having a prismatic surface 52 on one side and a back reflector 53 on the other side, similar to the light emitting panel 2 shown in FIG. 1. Light rays may be caused to enter the panel 50 perpendicular to the wave guide prism edges 54 from one or both end edges 55, 56 of the panel, and are internally reflected until they strike a deformity (in this case an edge 54 of the panel prismatic surfaces 52) which causes the light rays to be emitted. The size, shape and depth of the wave guide deformities 52 may be varied along the length of the panel to produce a desired light output distribution. Also, a back reflector 53 may be provided on the bottom side of the panel 50 to redirect light back through the panel.

In addition, the panel 50 includes a second prismatic film 60 disposed in close proximity to the panel prismatic surface 52 to shift the angular emission of light toward a particular application. The second prismatic film 60 may be separated from the first prismatic film or wave guide 51 by air or an epoxy filled gap 59. If the wave guide 51 and second prismatic film 60 are epoxied together, the epoxy 59 must be transparent and have a suitable index of refraction. Also, multiple prismatic films may be used in place of the single prismatic film 60, or the prismatic film 60 may be replaced by a diffuser or lenticular lens or the like.

Figure 9:
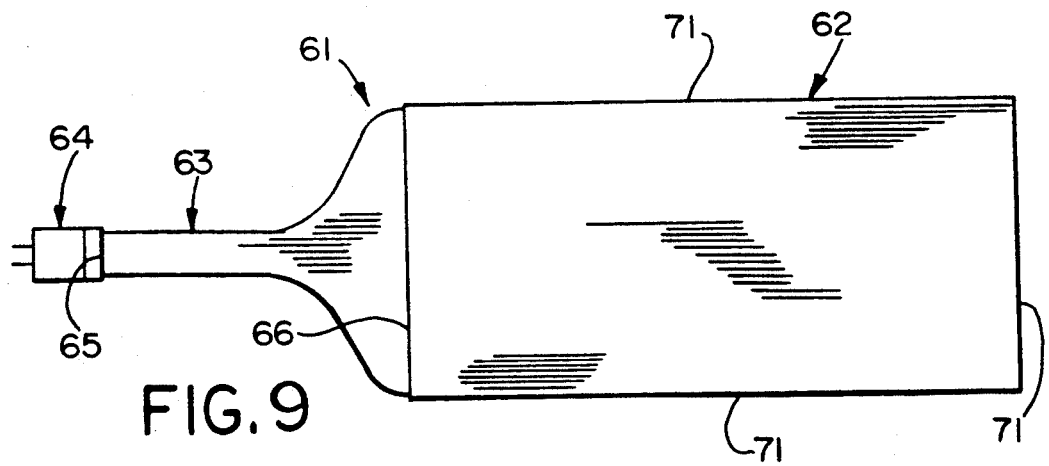
FIG. 9 is a top plan view of the thin panel illuminator of FIG. 8.
Figure 8:
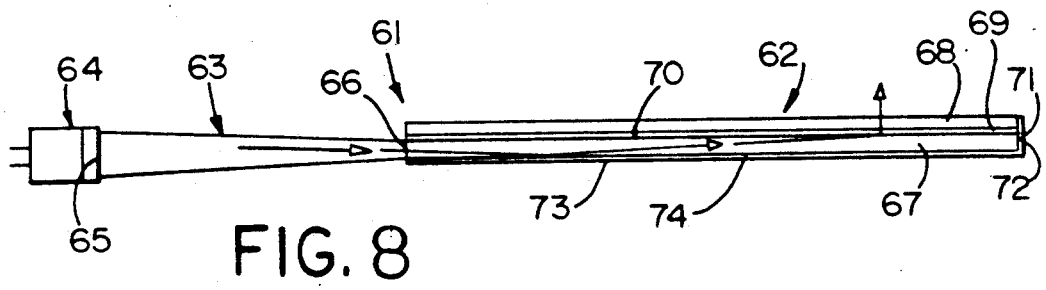
FIG. 8 is a schematic side elevation view of another form of thin panel illuminator in accordance with this invention.
Figure 10:
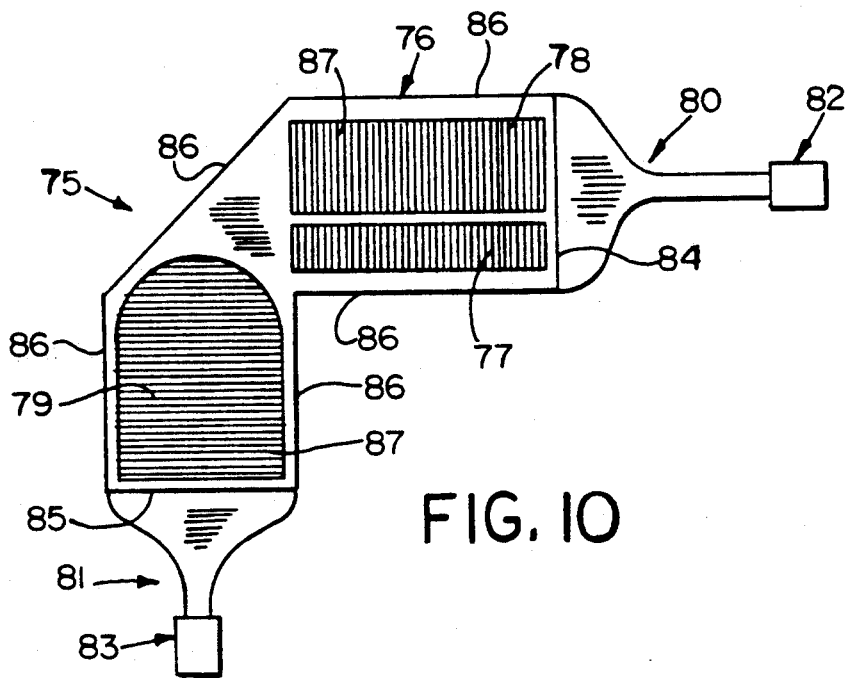
FIG. 10 is a top plan view of still another form of thin panel illuminator in accordance with this invention.

Other examples of thin panel illuminators in accordance with this invention are schematically shown in FIGS. 8-10. The thin panel illuminator 61 shown in FIGS. 8 and 9 includes a light emitting panel 62 and transition device 63 for transmitting light from a light source 64 focused on its input surface 65 to the panel input surface (end edge) 66. In this embodiment, the light emitting panel 62 comprises a laminated structure including a solid transparent wave guide 67 and extractor 68 joined together as by means of an adhesive layer 69 or the like. Light that enters the wave guide 67 from the transition device 63 is internally reflected until it strikes the wave guide-extractor interface 70 and is emitted from the extractor 68 toward a particular application. The index of refraction of the adhesive layer 69 may be varied relative to the indexes of refraction of the wave guide 67 and extractor 68 to produce a desired light output. If desired, the extractor 68 may be joined to the wave guide 67 by methods other than adhesive such as clamping, fastening, heat sealing and solvent gluing and the like. Also, the extractor 68 may consist of one or more coatings applied directly to selected areas of the top or bottom surfaces of the wave guide 67. These coatings may vary in frequency, index of refraction, color, and/or shape along the length of the panel 62. Reflectors 71 may also be provided at the end edge 72 of the wave guide 67 opposite the input edge 66 as well as at the side edges to reflect light back into the wave guide. Also, a back reflector 73 may be provided on the bottom surface 74 of the wave guide to reflect light back through the wave guide.

The thin panel illuminator 75 of FIG. 10 also includes a solid transparent light emitting panel 76, but which has multiple light output regions 77, 78, 79 of various shapes, and multiple transition devices 80, 81 for transmitting light from multiple light sources 82, 83 to different panel input edges 84, 85. In the FIG. 10 embodiment, two such transition devices 80, 81 are shown connected to two panel input edges 84, 85 which are substantially perpendicular to each other. The sides and back of the panel 76 may have reflective coatings 86 thereon.

Each output region 77-79 contains deformities 87 produced, for example, by molding, machining, stamping, etching, abrading, or laser cutting or the like to cause light to be emitted therefrom. The light output pattern or uniformity of light output from these output regions 77-79 may be controlled by varying the shape, depth and frequency of the deformities 87 relative to the input light ray distribution. For example, the various light output regions 77-79 of the panel 76 may be etched, roughened or cut into different shapes and levels of deformities using a laser by varying the power, position and cutting speed of the laser.

Figure 11:
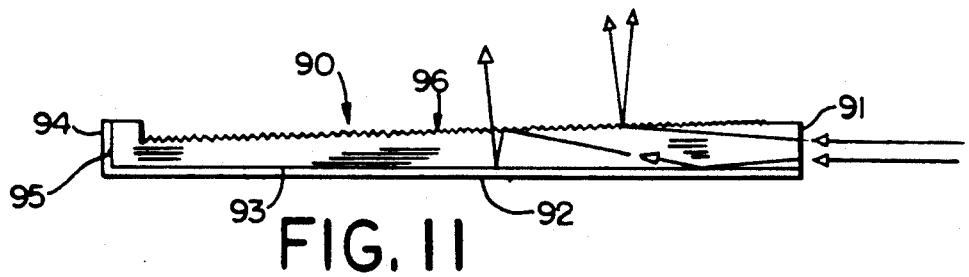
FIGS. 11–14 are schematic longitudinal sections of several forms of solid transparent light emitting panels in accordance with this invention.

FIGS. 11-14 schematically illustrate solid transparent light emitting panels having differently shaped light output regions. FIG. 11 shows a panel 90 with light input at one end edge 91 only and typical light ray travel. In this embodiment, panel 90 has a back reflector 92 on the bottom surface 93, an end reflector 94 on the end edge 95 opposite the input end edge 91, and a deformed light output region 96 whose depth progressively decreases along the length of the panel from the input end edge 91 toward the opposite end edge 95.

Figure 12:
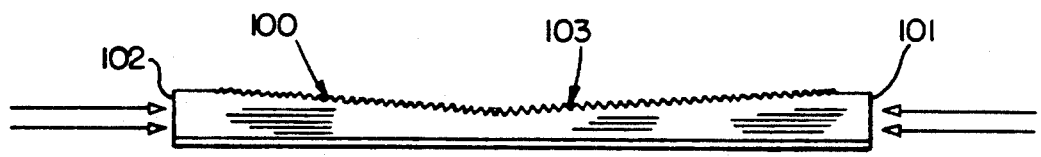
Figure 13:
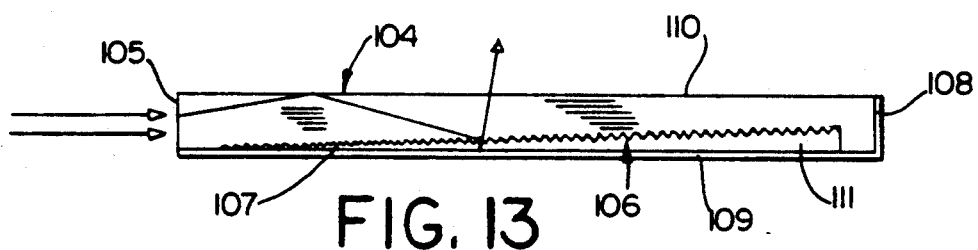

FIG. 12 shows a panel 100 with light input at opposite end edges 101 and 102 and a deformed output region 103 that progressively decreases in depth from both input end edges 101, 102 toward the middle of the length of the panel. FIG. 13 shows a panel 104 with light input at one end edge 105 only and a deformed light output region 106 on the bottom surface 107 whose depth progressively decreases from the input end edge 105 toward the opposite end edge 108. Also, a back reflector 109 is shown mounted on the bottom surface 107 of the panel 108 to redirect the light that is emitted from the light output region 106 back through the panel and out the top surface 110. In this embodiment, either an air gap or a transparent fill material 111 having a suitable index of refraction may separate the back reflector 109 from the panel 104.

Figure 14:
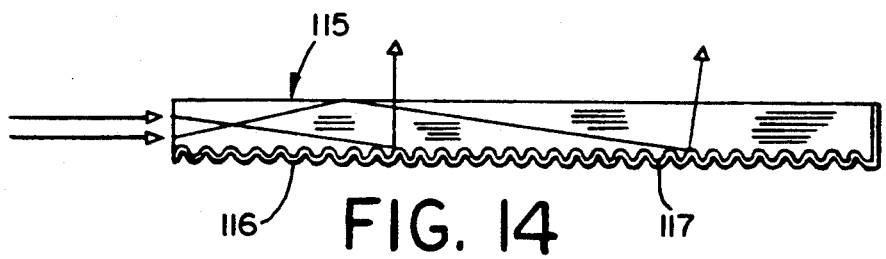
Figure 15:
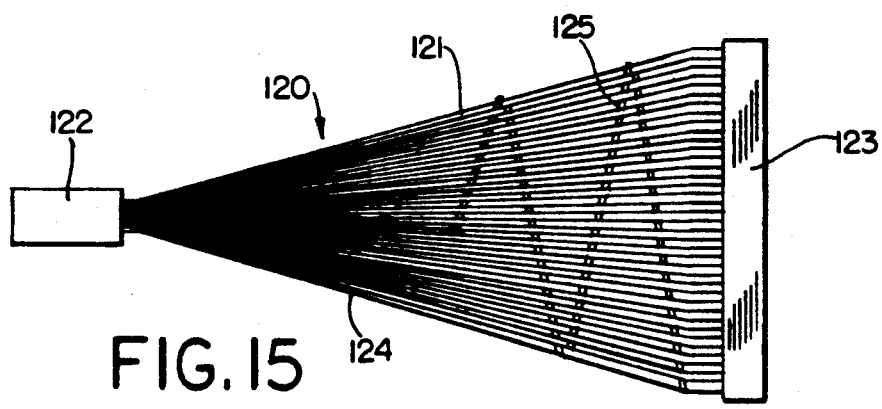
FIG. 15 is a top plan view of one form of transition device in accordance with this invention for converting an easily focused cross-sectional shape of light to the shape of a panel input surface.

Panel 115 shown in FIG. 14 is similar to panel 104 of FIG. 13 except that the back reflector 116 of FIG. 14 is deposited directly on the deformed light output region 117 and the depth of the panel is substantially uniform throughout its length.

In each instance, the light input surfaces (end or side edges) of the light emitting panels may be lens shaped or tapered to alter the input light ray distribution. Also, such light input surfaces may be coated with an anti-reflective coating or a coating that changes the numerical aperture of the panel. The numerical aperture is the sine of the vertex angle of the largest cone of input rays that can enter an optical system or element multiplied by the refractive index of the medium in which the vertex of the cone is located. Moreover, the light input surfaces, bottom surface and/or top surface of the panels may be coated to reflect or absorb certain frequencies of light.

From the foregoing it will be apparent that the wave guide confines and directs light in a direction determined by its boundaries, whereas the extractor causes light to be emitted from the wave guide. Examples of wave guides that may be utilized in the thin panel illuminators of the present invention include glass sheets, plastic films, liquid filled transparent enclosures, and crystals and the like. Also, examples of extractors that may be utilized in the thin panel illuminators include prismatic films, diffusers, lenticular lenses, coatings and other systems or materials that cause the internal critical angle to be exceeded which in turn causes light to be emitted.

Referring next to FIGS. 15-19, different forms of transition devices for use in transmitting light from a remote location to the light emitting panels of the present invention are shown. As previously indicated, the purpose of such transition devices is to transmit light focused on its input surface or surfaces to a light emitting panel by converting a relatively easily focused cross-sectional shape of light to the shape of the panel input surface. The transition device 120 shown in FIG. 15 comprises a plurality of optical fibers 121 having a round or other shaped connector 122 at one end on which a source of light is easily focused and a rectangular or other shaped connector 123 at the other end substantially corresponding in shape to the panel input surface. The optic fibers 121 may be made of glass or a suitable transparent plastic material, and may be formed into a ribbon-like cable 124 by loosely weaving cross (fill) threads 125 between the optical fibers 121 which act as a harness without causing the optical fibers to bend to the degree necessary to emit light from the transition device 120. Preferably, the optical fiber strands 121 of both of the connectors 122, 123 are scrambled to produce a higher uniformity in the transition device output. Moreover, the ends of the connectors 122, 123 are desirably highly polished to minimize losses, and may be coated to reflect or absorb certain wavelengths of light.

Figure 16:
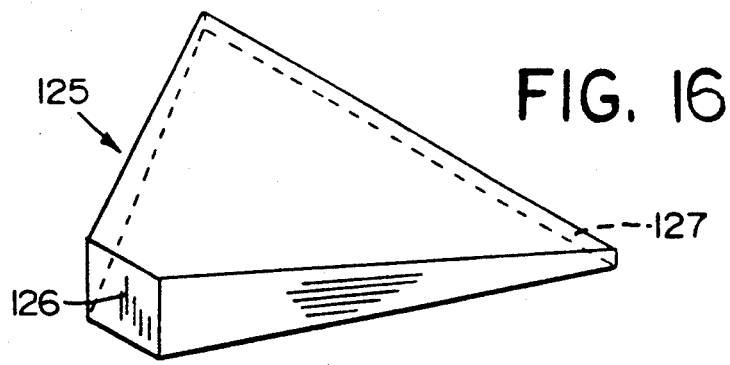
FIGS. 16–19 are schematic perspective views of various other forms of transition devices in accordance with this invention.
Figure 17:
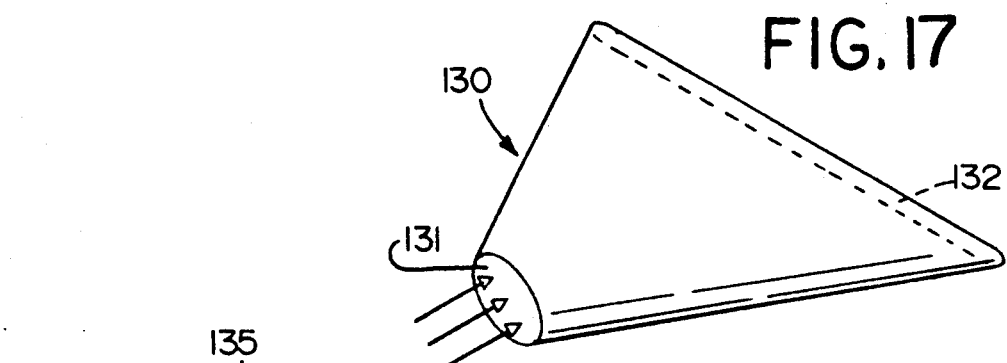
Figure 18:
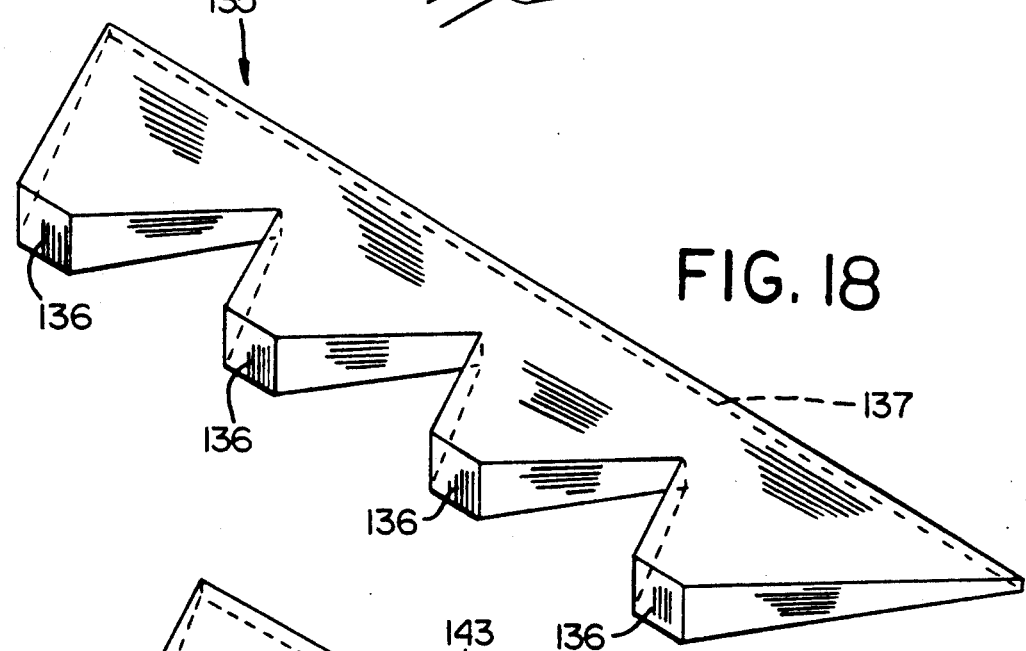
Figure 19:
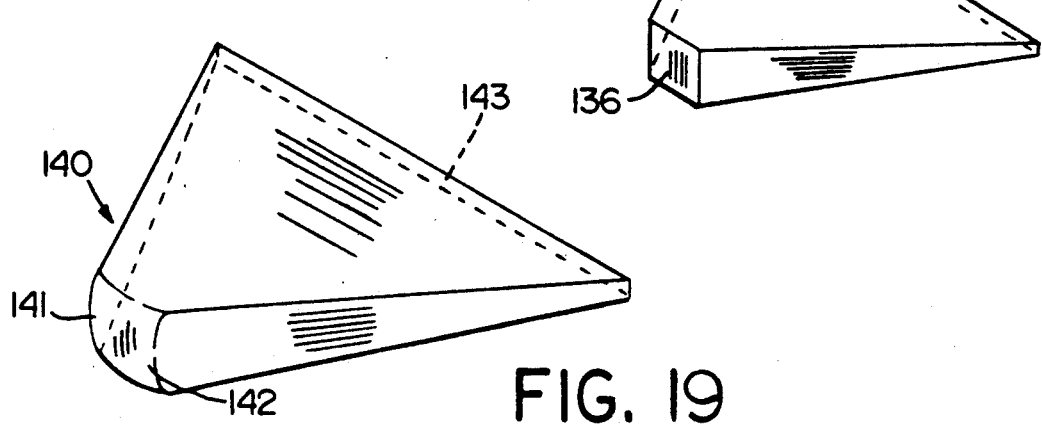

In lieu of using optical fibers in the transition device, the transition device may be made from a solid transparent material such as glass, plastic or the like having an input surface at one end of a cross-sectional shape on which a light source is easily focused such as round or square and having an output surface at the other end in the shape of the panel input surface. FIG. 16 shows one such solid transparent transition device 125 having a substantially square input surface 126 at one end and a substantially rectangular output surface 127 at the other end, whereas FIG. 17 shows another solid transparent transition device 130 having a round input surface 131 at one end and a substantially rectangular output surface 132 at the other end. Also, FIG. 18 shows a solid transparent transition device 135 including multiple input (or output) surfaces 136 at one end and a single output (or input) surface 137 at the other end. FIG. 19 shows another solid transparent transition device 140 with a lens 141 at the input surface 142 shaped to spread the light evenly across its output surface 143. In like manner, the output surface of the solid transition devices as well as the input surface of the light emitting panels may be lens shaped or tapered to alter the input light ray distribution.

Although the respective input and output surfaces of the various transition devices are shown as square, round or rectangular, they may be elliptical or any other shape necessary to fit a particular application. Moreover, multiple light sources may be used with a single panel or multiple panels used with a single light source by providing the transition device with multiple input connectors leading to a single output connector or a single input connector leading to multiple output connectors as schematically shown in FIG. 18. Furthermore, filters may be placed between the light source and panel or transition device to reflect or absorb certain wavelengths of light. Also, a moving or rotating filter may be used to produce color effects.

Although the various solid transparent transition devices are shown separate from the light emitting panels, it will be appreciated that such transition devices may be formed as an integral part of the panels. Also, in certain applications the transition devices may be eliminated and the light focused directly on the panel input surfaces to cut down on system losses.

As will be apparent, the various thin panel illuminators disclosed herein may be used for a great many different applications, including for example general lighting, phototherapy treatment, and radiation curing of adhesives and epoxies and the like. Typical general lighting applications include back lighting of liquid crystal displays or transparencies or the like, task lighting, machine vision lighting, safety lighting for both commercial and industrial as well as automotive applications, explosion-proof lighting, underwater lighting, display lighting and infrared heating and the like. Phototherapy treatment includes such applications as tanning light, phototherapy of neonatal hyperbilirubinemia, photochemotherapy, photosynthesis of plants, and so on. Also, radiation curing of adhesives and epoxies may be used in a wide variety of applications including aerospace, dental, circuit board, electronic component, and optical component manufacturing, to name a few.

Figure 20:
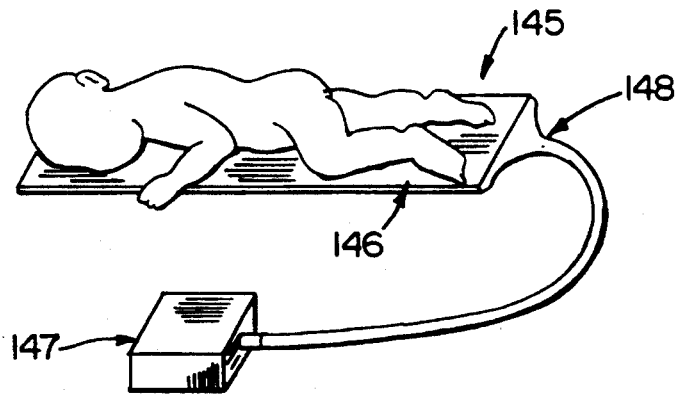
FIGS. 20–22 are schematic perspective views of several different shapes of panels constructed in accordance with this invention.

To facilitate use of such thin panel illuminators for phototherapy, the panels may be formed in the shape of a pad, belt, collar, blanket, strap or other suitable shape. FIG. 20 schematically illustrates a thin panel illuminator 145 in accordance with this invention being used for phototherapy treatment of infants including a solid transparent light emitting panel 146 in the shape of a pad and a light source 147 designed for example to emit sufficient radiation in spectral regions that lower plasma bilirubin levels. The light source 147 may also be designed to reduce output of infrared and ultraviolet radiation that may be harmful to the infant. In addition, such light source may be designed to provide sufficient illuminance and color rendering for inspection of an infant's skin color. A transition device 148 in accordance with this invention transmits the light from the light source 147 to the light emitting panel 146 in the manner previously described.

Figure 21:
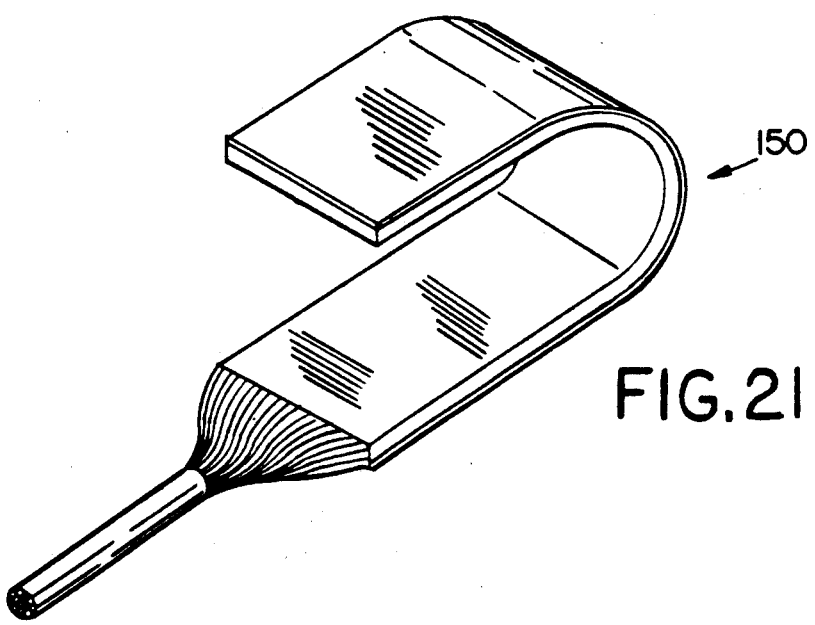
Figure 22:
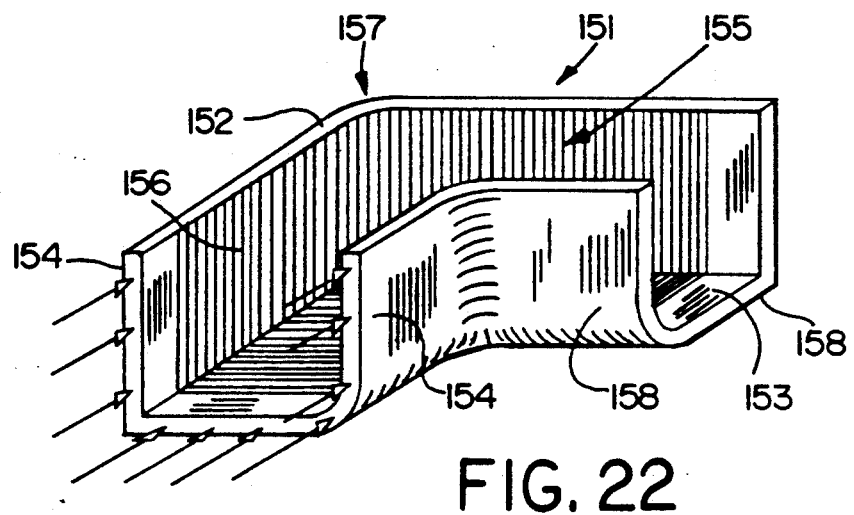

Although the light emitting panel 146 is shown in FIG. 20 as being flat, it will be appreciated that the panel may be curved or otherwise formed to emit light in a desired manner or on a particular location. FIG. 21 schematically shows a light emitting panel 150 bent or formed to fit a particular application. Also, FIG. 22 shows another light emitting panel 151 in accordance with this invention in the shape of a channel 152 having a bottom wall 153, spaced apart side walls 154 and an open top 155, with deformities 156 along the interior length of the bottom and side walls 153, 154 to cause light to be emitted interiorly. The channel 152 may be curved or bent at 157 intermediate its length with the radius of curvature around which the light travels being sufficiently large that light is not emitted. Also, a reflective surface 158 may be applied to the exterior surfaces of the panel to redirect light interiorly back through the panel bottom and side walls 153, 154 toward a particular application.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. A panel illuminator comprising a solid transparent panel member having top and bottom surfaces and an input edge for receiving light from a light source for conduction through said panel member, and means for causing the conducted light to be emitted from one of said surfaces along the length of said panel member, said means for causing light to be emitted comprising a solid transparent film on one of said surfaces of said panel member having spaced apart prism edges running generally perpendicular to said input edge, and deformities along the length of said prism edges.

2. The illuminator of claim 1 wherein the depth and shape of said deformities varies along the length of said prism edges to produce a desired light output distribution.

3. A light emitting panel comprising a solid transparent wave guide having an input edge for receiving light from a light source for conduction through said wave guide, a prismatic surface on one side of said wave guide for causing such conducted light to be emitted therefrom, said prismatic surface including a plurality of spaced apart prism edges extending substantially parallel to said input edge, a prismatic film in close proximity to said prismatic surface for shifting the angular direction of light emitted therefrom, and transparent means for bonding said prismatic film to said prismatic surface.

4. A light emitting panel comprising a solid transparent wave guide having an input edge for receiving light from a light source for conduction through said wave guide, and a prismatic surface on one side of said wave guide for causing such conducted light to be emitted therefrom, said wave guide being in the shape of a channel having a bottom wall, spaced apart side walls and an open top, and prismatic surfaces along the interior length of said bottom and side walls to cause light to be emitted interiorly.

5. The panel of claim 4 wherein the exterior of said channel has a reflective coating to redirect any externally emitted light back to the channel interior.

6. A panel illuminator comprising a solid transparent panel member having top and bottom surfaces and an input edge for receiving light from a light source for conduction through said panel member, and means for causing the conducted light to be emitted from one of said surfaces along the length of said panel member, said means for causing light to be emitted comprising a prismatic surface on one of said surfaces of said panel member, said prismatic surface including a plurality of spaced apart edges which run generally parallel to said input edge, and a prismatic film disposed in close proximity to said prismatic surface for shifting the angular direction of light emitted therefrom, said prismatic film being bonded to said prismatic surface by transparent means.

7. A panel illuminator comprising a solid transparent panel member having top and bottom surfaces and an input edge for receiving light from a light source for conduction through said panel member, said means for causing light to be emitted comprising a prismatic surface on one of said surfaces of said panel member, a prismatic film disposed in close proximity to said prismatic surface for shifting the angular direction of light emitted therefrom, and transparent means for bonding said prismatic film to said prismatic surface.

8. A light emitting panel comprising a solid transparent wave guide having an input edge for receiving light from a light source for conduction through said wave guide, a prismatic surface on one side of said wave guide for causing such conducted light to be emitted therefrom, and a prismatic film in close proximity to said prismatic surface for shifting the angular direction of light emitted therefrom.

9. The panel of claim 8 wherein there is an air gap between said prismatic film and said prismatic surface.

10. A light emitting panel comprising a solid transparent wave guide having an input edge for receiving light from a light source for conduction through said wave guide, and a prismatic surface on one side of said wave guide for causing such conducted light to be emitted therefrom, said prismatic surface including a plurality of spaced apart prism edges running generally perpendicular to said input edge, said prismatic surface progressively decreasing in depth along the length of said wave guide as the distance from said input edge increases.

11. The panel of claim 10 further comprising reflector means for redirecting the emitted light from said prismatic surface back through said wave guide.

12. The panel of claim 11 wherein there is an air gap between said reflector means and said prismatic surface.

13. The panel of claim 11 wherein said reflector means is bonded to said wave guide by a transparent adhesive.

14. The panel of claim 11 wherein said reflector means is deposited directly on said prismatic surface.

15. A light emitting panel comprising a solid transparent wave guide having an input edge for receiving light from a light source for conduction through said wave guide, and a prismatic surface on one side of said wave guide for causing such conducted light to be emitted therefrom, said prismatic surface including a plurality of spaced apart prism edges running generally perpendicular to said input edge, said wave guide having a pair of input edges at opposite ends thereof for receiving light from plural light sources.

* * * * *